(12) United States Patent
Miller et al.

(10) Patent No.: US 8,460,776 B2
(45) Date of Patent: Jun. 11, 2013

(54) FIRE RESISTANT ENCAPSULATED FIBERGLASS PRODUCTS

(75) Inventors: William Scott Miller, Newark, OH (US); Brian L Swift, Oxford, GA (US)

(73) Assignee: Knauf Insulation GmbH, Shelbyville, IN (US)

( * ) Notice: Subject to any disclaimer, the term of this patent is extended or adjusted under 35 U.S.C. 154(b) by 0 days.

(21) Appl. No.: 13/252,570

(22) Filed: Oct. 4, 2011

(65) Prior Publication Data

US 2012/0021161 A1 Jan. 26, 2012

Related U.S. Application Data

(63) Continuation of application No. 11/544,123, filed on Oct. 6, 2006, now Pat. No. 8,039,077.

(60) Provisional application No. 60/724,977, filed on Oct. 7, 2005.

(51) Int. Cl.
*B32B 17/10* (2006.01)

(52) U.S. Cl.
USPC ........... 428/68; 428/35.2; 428/36.91; 428/71; 428/215; 442/143; 524/115

(58) Field of Classification Search
USPC .......... 428/68, 35.2, 36.91, 71, 215; 442/143; 524/115
See application file for complete search history.

(56) References Cited

U.S. PATENT DOCUMENTS

| | | | |
|---|---|---|---|
| 3,549,474 A | 12/1970 | Lonning | |
| 4,058,643 A | 11/1977 | Marshall et al. | |
| 4,880,680 A | 11/1989 | Kistner | |
| 5,051,144 A | 9/1991 | Kistner | |
| 5,665,447 A | 9/1997 | Greaves et al. | |
| 5,817,387 A | 10/1998 | Allwein et al. | |
| 5,837,621 A * | 11/1998 | Kajander | 442/143 |
| 6,357,504 B1 * | 3/2002 | Patel et al. | 156/499 |
| 6,769,455 B2 | 8/2004 | Toas et al. | |
| 6,835,413 B2 | 12/2004 | Patel | |
| 6,905,563 B2 | 6/2005 | Dong | |
| 7,060,155 B2 | 6/2006 | Dong et al. | |
| 7,083,693 B2 | 8/2006 | Chen et al. | |
| 2003/0008093 A1 * | 1/2003 | Ray et al. | 428/36.91 |
| 2004/0121152 A1 | 6/2004 | Toas | |
| 2005/0009965 A1 | 1/2005 | Schell et al. | |
| 2005/0032934 A1 | 2/2005 | Muenzenberger et al. | |
| 2005/0236606 A1 | 10/2005 | Toas et al. | |

FOREIGN PATENT DOCUMENTS

| | | |
|---|---|---|
| EP | 1505124 A1 | 2/2005 |
| WO | 98/34780 A1 | 8/1998 |

OTHER PUBLICATIONS

International Search Report and Written Opinion for PCT Application No. PCT/US2006/03922, dated Mar. 13, 2007 (14 pages).

\* cited by examiner

*Primary Examiner* — Brent O'Hern
(74) *Attorney, Agent, or Firm* — Barnes & Thornburg LLP

(57) ABSTRACT

Fiberglass-based materials and fire retardant compositions are described, wherein the fiberglass materials and the fire retardant compositions are encapsulated in a plastic cover. Methods for making encapsulated fiberglass articles are also described.

17 Claims, 6 Drawing Sheets

FIRE RESISTANT ENCAPSULATED FIBERGLASS PRODUCTS

CROSS REFERENCE TO RELATED APPLICATION

This application is a continuation of U.S. application Ser. No. 11/544,123, filed Oct. 6, 2006 (now U.S. Pat. No. 8,039,077), which claims the benefit under 35 U.S.C. §119 (e) of U.S. Provisional Application Ser. No. 60/724,977, filed Oct. 7, 2005, the disclosures of which are hereby incorporated herein by reference.

TECHNICAL FIELD

The present disclosure pertains to fiberglass articles of manufacture. In particular, the present disclosure pertains to fiberglass articles of manufacture that are suitable for use as duct liner insulation.

BACKGROUND

Fiberglass mats are used as a heat and sound insulating material in automobiles, and as heat and sound insulation in a variety of other products, including duct liners. The use of traditional fiberglass mats for some applications has recently decreased due to various perceptions, correct or not, regarding their safety and stability. For example, fiberglass duct liners are being de-specified by schools, hospitals, and some government agencies. It has been suggested that fiberglass duct lining materials may capture and hold dirt in the duct and provide a food source for mold and bacterial growth. Additionally, it has been suggested that fiberglass may capture and retain moisture in duct systems, providing a water source for mold and bacterial growth. Finally, it has been suggested that fiberglass may erode in the duct and be blown or emitted into the workspace. Such perceptions continue, in spite of evidence to the contrary, and have the effect of reducing the use of conventional fiberglass duct liners.

Alternatives to fiberglass for use in duct linings include elastomeric foam/rubber or cotton-based products. Though elastomeric foams may be hydrophobic and thus provide a less hospitable environment for mold and bacteria, they often exhibit poor sound absorption characteristics, leading to noisy workplace environments. Although the transmission of noise can be reduced by the insertion of acoustic baffles in the ductwork, such baffles may also tend to restrict airflow, resulting in reduced blower capacity and increased air handling costs. Furthermore, the thickness of elastomeric foams is limited to less than about one inch, due to its propensity for smoke development and flame spread in a fire. Cotton-based products have the desirable property that they can be prepared as a recycled product, but they are typically treated with fire retardant and anti-microbial agents to allow their use in ducts. However, the long-term efficacy of these treatments is questionable, because cotton material is a food source for molds, and fire retardants may migrate with water and gravity.

The present disclosure describes a fiberglass article that includes a fiberglass product that is covered within a flexible, polymer envelope. In addition, the present disclosure describes a fiberglass article that includes a layer of fire resistant material in conjunction with the plastic cover or the fiberglass component. It is appreciated that fiberglass articles described herein are stable and retain the heat and sound insulating properties of traditional fiberglass with acceptable or enhanced fire performance characteristics.

SUMMARY

In one embodiment, fabricated fiberglass articles are described herein. The fiberglass articles are articles of manufacture that include a fiberglass product, a fire resistant material, and a plastic cover, where the fiberglass product and the fire resistant material are encased in the plastic cover. In one aspect, the fire resistant material is disposed on the fiberglass product as a layer. In another aspect, the fire resistant material is disposed on the plastic cover as a layer. In another aspect, the fire resistant material is incorporated into either or both the plastic cover and the fiberglass product. In another aspect, the plastic cover is a flexible plastic cover. In another aspect, the plastic cover is resistant or impenetrable to fluids.

In another embodiment, methods for preparing encapsulated fiberglass articles are described. In one aspect, the method comprises the steps of coating a fiberglass product with a composition comprising a fire retardant, and heat sealing the coated fiberglass product between two sheets of plastic to form the plastic cover.

DETAILED DESCRIPTION

Figure 1:
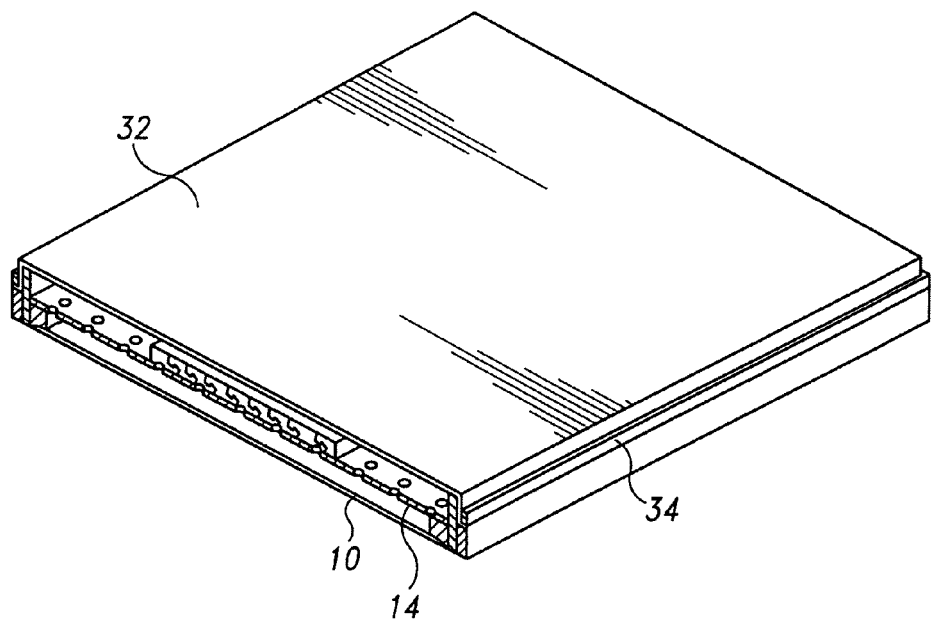
FIG. 1 illustrates one device suitable for use in encasing a fiberglass product in the form of a mat in a polymer film in accordance with one embodiment.

The present disclosure describes fiberglass-based materials and articles of manufacture. The present disclosure also describes improved fiberglass-based materials that have enhanced durability, handling and fire performance (i.e., decreased flame spread and smoke development). As used herein, the term "fiberglass" is intended to encompass material made from glass fibers having a length ranging from about 1 inch (2.54 cm) to about 12 inches (30.48 cm). The glass used to form the fiberglass may be silica-based or other inorganic substance provided it has the requisite properties to allow the formation of fibers. In one aspect, the fibers are fine fibers having diameters in the range from about 1 micron to about 10 microns, and/or lengths in the range from about 1 inch (2.54 cm) to about 12 inches (30.48 cm).

As used herein, the term "fiberglass product" is intended to encompass fiberglass or composite materials comprising fiberglass and additional optional ingredients or additives that reinforce, fortify, and otherwise modify the fiberglass product, including for example, glass-reinforced plastic or GRP, also known as glass-fiber reinforced epoxy (GRE), and described in more detail below.

As used herein, the term "thermoplastic" refers to a polymer that softens when exposed to heat and returns to its original condition when cooled to room temperature. Illustratively, the thermoplastic polymer is a high molecular weight polymer.

As defined herein, a "fire retardant" is a substance applied to or incorporated in another material, such as a combustible material, to reduce or eliminate the tendency of the other material to ignite when exposed to surface burning characterization tests such as ASTM E-84, UL 723, or NFPA 256.

As defined herein, "good sound attenuation properties" means having a Noise Reduction Coefficient of 0.65 or higher, when tested in accordance with ASTM C 423, and "good heat insulation properties" means having an R-value of at least 2.5 per inch.

In one illustrative embodiment, the fiberglass materials and articles of manufacture described herein include a fiberglass product, such as a woven fiberglass mat, a flexible plastic cover encasing the fiberglass product, and a fire retardant composition. In one aspect, the fire retardant composition is positioned adjacent to the fiberglass product, and encased in the plastic cover.

In another illustrative embodiment, the improved fiberglass based materials comprise a fiberglass product and a layer of a fire retardant, wherein the fiberglass product and the fire retardant are encapsulated by a plastic cover. In another embodiment, the plastic cover is mechanically bonded to the exterior surface of the fiberglass product. In another embodiment, the fiberglass product has a first and second surface and a side edge extending between said first and second surfaces and along the entire perimeter of the first and second surface, and the plastic cover comprises a first and second sheet of flexible plastic in contact with, and at least partially embedded into the first and second surface of the fiberglass product. Furthermore, the first and second sheets of the plastic cover are bound to one another adjacent to the side edge of the fiberglass product to form a continuous seam around the fiberglass product. In another embodiment, the plastic cover is also in contact with, and at least partially embedded into the side edge of the fiberglass product. It is appreciated that binding the plastic cover to the surface of the fiberglass product may advantageously allow the plastic encapsulated material to be fabricated and cut like traditional fiberglass materials, but with reduced release of fibrous material and reduced irritation to the worker.

In accordance with another illustrative embodiment, the plastic cover comprises a fluid impermeable plastic that becomes adhesive upon heating. In one aspect, the plastic cover comprises a thermoplastic polymer. Thermoplastic polymers suitable for use in the present invention are known to those skilled in the art and include polyvinyl chloride (PVC), nylons, fluorocarbons, polyethylene, polyurethane prepolymer, polystyrene, polypropylene, polycarbonate, polyethylene terephthalate, ethylene vinyl acetate, polyolefins, cellulosic resins, acrylic resins and copolymers, block copolymers, as well as blends, and mixtures thereof. In another aspect, the plastic cover comprises a polymer that may be selected from polyvinyl chloride, nylon, polyethylene, polyolefin, polycarbonate, and the like. In another aspect, the plastic cover is comprised of a polyethylene polymer, copolymer, or polymer blend.

In another illustrative embodiment, the plastic cover comprises a thermoplastic polymer having a high average molecular weight. In one aspect, the average molecular weight of the thermoplastic polymers described herein is in the range from about $1 \times 10^3$ to about $5 \times 10^6$ g/mole. In another aspect, the average molecular weight of the thermoplastic polymers described herein is in the range from about $2 \times 10^5$ to about $3 \times 10^6$ g/mole.

In another illustrative embodiment, the plastic cover includes two sheets of plastic that are positioned directly opposed to one another and bound to one another along the perimeters of each of the two sheets. In one aspect, the plastic sheets are also bound to the exterior surface of the fiberglass product. The plastic sheets can be bound to one another, and optionally to the fiberglass product through the use of standard and conventional adhesives for binding plastic, including plastic sheets. In another embodiment, the plastic cover includes a thermoplastic polymer that becomes adhesive when heated, and the two plastic sheets are bound to one another, and optionally to the fiberglass product by heating the two sheets, and contacting the surfaces to be adhered and holding them in contact until the plastic cools and sets creating a bond between the two materials. In another embodiment, the encapsulated fiberglass product exhibits good sound attenuation properties or characteristics. In another embodiment, the encapsulated fiberglass product retains the sound attenuation attributes of an open fiberglass material, while being contained within a water resistant or water impermeable barrier. In accordance with another embodiment, the plastic cover comprises polyethylene sheets that are about 1 mm to about 5 mm thick; and in one illustrative aspect, the polyethylene sheets are about 3 mm thick.

In another illustrative embodiment, the encapsulated fiberglass material is further provided with a fire retardant composition that is also encapsulated by the plastic cover. It is appreciated that with the addition of a fire retardant composition, the encapsulated fiberglass product may also retain the fire performance properties of traditional open fiberglass material. The fire retardant may be formed as a discrete layer on the surface of the fiberglass product or on the interior surface of the plastic cover. Alternatively, the fire retardant composition may be embedded into, incorporated into, or mixed with a portion or the entire composition comprising the fiberglass product and/or the plastic cover. In another embodiment, at least one surface of the fiberglass product is coated with a layer of a composition comprising a fire retardant. In accordance with another embodiment, both the first and second surface of the fiberglass product are coated with the fire retardant composition. In another embodiment, all external surfaces of the fiberglass product are coated with a fire retardant composition.

In another illustrative embodiment, the fiberglass product comprises a porous fiberglass mat, wherein at least the fibers located at one of the surfaces of the mat are coated with a composition comprising a fire retardant. In accordance with another embodiment, the exterior fibers of both the first and second surface of the porous fiberglass mat are coated with a fire retardant composition.

The fire retardant coating may be applied as a layer of dry particularized material or it may be sprayed on as a suspension or solution and subsequently dried. In one aspect, the fire retardant is applied to at least one surface of the fiberglass product in an amount ranging from about 0.5 grams to about 5 grams of active ingredient per square meter; in another aspect, the fire retardant is applied in an amount ranging from about 0.5 grams to about 3 grams of active ingredient per square meter; in another aspect, the fire retardant is applied in an amount ranging from about 0.5 grams to about 1.5 grams of active ingredient per square meter; and in another aspect, the fire retardant is applied in an amount of about 1 gram of active ingredient per square meter (i.e., about 0.1 grams/square foot).

In another illustrative embodiment the fire retardant composition is applied to the interior surface of one or both sheets of plastic that comprise the plastic cover. In one embodiment, a fire retardant composition is blended with a liquid polymer prior to formation of the thermoplastic film. In such an embodiment, the plastic cover comprises a thermoplastic film having a fire-retardant material incorporated directly therein.

Fire retardants suitable for use in the present invention include ammonium sulfamate, zinc borate, antimony oxide, antimony oxychloride ammonium bromide, halogenated phosphorous complexes, monoammonium phosphate, diammonium phosphate, hydrated aluminum oxide, phosphonitrilic chloride; and organic fire retardants such as halogenated organic fire retardants (i.e., brominated alkoxydiphenyl sulfone, chlorendic anhydride, chlorinated paraffins, halogenated organic polyphosphonate); vinyl acetate; vinyl chloride and acrylic emulsions (i.e., methyl methacrylate); alkyl diaryl phosphate; cresyl diphenyl phosphate, octyl diphenyl phosphate, trialkyl boron ester; tris (dichloropropyl) halogenated phosphonate esters and tricresyl phosphate, colloidal antimony, borax, vermiculite/expandable graphite and other similar materials. In accordance with one embodiment, the fire retardant composition comprises a compound selected from the group consisting of monoammonium phosphate, diammonium phosphate, and vermiculite/expandable graphite.

In accordance with another illustrative embodiment, the fiberglass product that is encapsulated by the plastic cover comprises a continuous mat of fiberglass. In another embodiment, an article of manufacture is provided comprising a plurality or series of fiberglass sheets, wherein the sheets are encased in a single plastic covering, and each fiberglass sheet is separated from the others by a seam formed in the plastic cover. In another embodiment, the final product comprises a series of rectangular shaped fiberglass sheets that are positioned head to foot and encased in a plastic cover, wherein the plastic cover is sealed to inhibit fluid communication between each fiberglass sheet and inhibit fluid communication from the interior of the encapsulated space to the exterior.

In another illustrative embodiment, each fiberglass mat is formed to have a first and second surface and a side edge extending between said first and second surfaces and along the entire perimeter of the first and second surface. The plastic cover, comprising top and bottom sheets of plastic, covers the first and second surface and side edge of each fiberglass mat, and the portions of the plastic cover not in contact with the first and second surface and side edge of each fiberglass mat bound to one another to inhibit fluid communication between each fiberglass mat and from the interior of the encapsulated space and the exterior. Furthermore, a fire retardant composition is located between said plastic cover and each fiberglass mat, or is formed as an integral part of the plastic cover. In another embodiment, the fiberglass mats have good sound insulating and heat insulation properties. In another embodiment, the first and second surfaces of the mats are bound to the plastic cover. Furthermore, in another embodiment, the plastic cover comprises first and second flexible plastic sheets comprised of a thermoplastic resin that becomes adhesive when heated, and the first and second sheets of said plastic cover are bound to one another by a heat-sealed seam.

In another illustrative embodiment, a plastic encapsulated fiberglass product is described comprising a plurality of fiberglass products arrayed in columns and rows wherein first and second sheets of plastic encase the fiberglass product within a single envelope, and the first and second sheets of plastic contact one another and form a grid of seams between each of the rows and columns of fiberglass products. In this embodiment, each of the fiberglass products is sealed off from each of the other fiberglass products. This embodiment allows for the material to be cut along one or more of the seams to obtain any desired smaller sizes of the material without exposing unencapsulated fiberglass product to the external environment. It is appreciated that in this embodiment, the material can be cut without compromising or sacrificing the fluid resistant or impermeable barrier surrounding each of the fiberglass products. In one aspect, the fist and second sheets of plastic are also adhered to the first and second surfaces of each of the encased fiberglass products.

In another illustrative embodiment, the present invention also provides a method for preparing plastic encapsulated fiberglass product, including in one aspect, an enhanced fire resistant plastic encapsulated fiberglass product. The method comprises the steps of applying a fire retardant composition to a fiberglass product; contacting a first sheet of plastic with a first surface of the fiberglass product; and covering the second surface of the fiberglass product with the second sheet of plastic, wherein the fire retardant composition is encapsulated by the plastic cover. In another embodiment, the fire retardant composition is coated onto the fiberglass product or the second plastic sheet in a manner such that the fire retardant composition is located between the second surface of the fiberglass product and the second sheet of plastic in the final product. The first and second sheets of plastic are then sealed to one another adjacent to the side edge of the fiberglass product to form a continuous seam around the fiberglass product. In another embodiment, the fire retardant composition is applied to either the surface of the fiberglass product or the interior surface of the plastic sheet prior to contacting the fiberglass product with the first or second sheet of plastic. The fire retardant can be applied either as a granular power or sprayed on as a liquid solution or suspension and optionally dried, as described herein. In another embodiment, the fire retardant composition is applied to both the first and second surface of the fiberglass product, or it is applied to the interior surface of both the first and second sheets of plastic. In another embodiment, the plastic sheets comprising the plastic cover comprise a fire retardant composition, wherein the fire retardant is formed as an integral part of, or is incorporated into the plastic sheet.

In another illustrative embodiment, a method for preparing a flexible, enhanced fire resistant, encapsulated fiberglass product is described, where the method comprises the use of a thermoplastic sheet and the use of heat to seal the fiberglass product within a plastic cover. More particularly, a method is described comprising the steps of providing a porous fiberglass product, disposing a first sheet of air impervious plastic adjacent to the first surface of the fiberglass product, wherein the first sheet comprises material that becomes adhesive when heated, heating the first sheet such that it becomes adhesive, biasing the first sheet into contact with the first surface of the fiberglass product and cooling the first plastic sheet until it sets. In the methods described herein, the plastic sheet may be or is typically cut to have dimensions greater than the first surface of the fiberglass product such that the first sheet extends past the entire perimeter of the first surface of the fiberglass product in all directions. Thus, the first sheet when bound to the fiberglass product has a lip of material (of about 1.0 cm to about 1.8 cm, and in one illustrative embodiment about 1.3 cm) extending completely around the fiberglass product. A fire retardant composition is then applied to the second surface of the fiberglass product, or to the interior surface of the second plastic sheet, and the second sheet of plastic is positioned adjacent the article. The second sheet is heated such that it becomes adhesive, and then it is biased into contact with the second surface of the fiberglass product and into contact with at least a portion of the first sheet that extends past the entire perimeter of the first surface of the fiberglass product to become adhesively attached to the fiberglass product and the first sheet, thus encapsulating the fiberglass product without the use of an adhesive material other than that comprising the first and second sheets. In another embodiment, the sheets of plastic are biased into contact with the fiberglass product through the use of a vacuum. Illustrative methods for sealing a fiberglass product between two sheets of plastic are described in U.S. Pat. Nos. 5,051,144 and 4,880,680, the disclosures of which are hereby incorporated herein by reference in their entirety.

Figure 2:
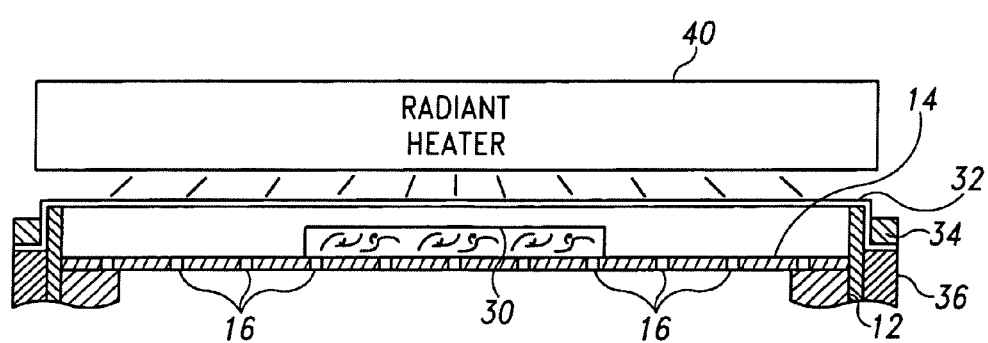
FIG. 2 illustrates a fiberglass product 30, in the form of a mat, supported on a planar support 14 with a first plastic sheet 32 supported above the fiberglass product 30.
Figure 3:
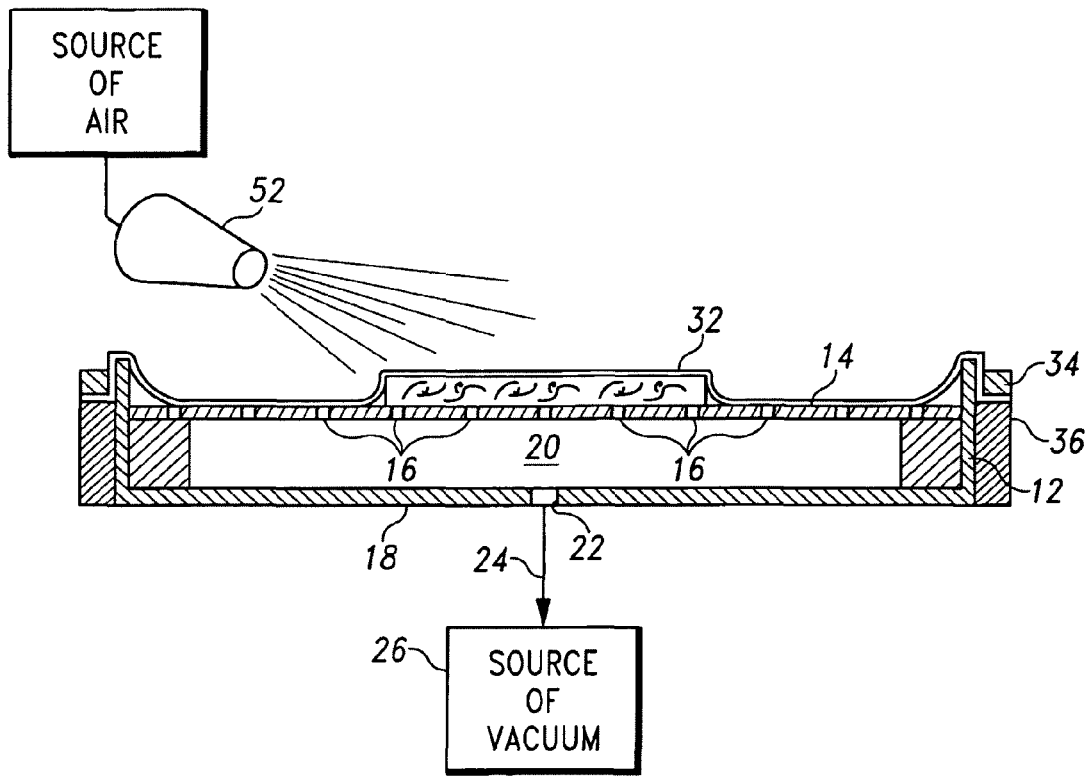
FIG. 3 illustrates the adherence of the first plastic sheet 32 to the fiberglass product 30 through the use of vacuum source 26.

Referring to the drawings, FIG. 1-3 illustrate a device for preparing the encapsulated fiberglass products of the present invention. The device has an aluminum base 10 with an upstanding sidewall 12. The base preferably has a rectangular configuration. Sidewall 12 extends around the four sides of the base. The base has a horizontal, planar support 14. Support 14 has a pattern of passages or openings 16. Support 14 is mounted above bottom wall 18 of the base to form vacuum chamber 20. The bottom wall 18 has an opening 22 connected by a conduit 24 to a source of vacuum 26, such as a vacuum pump, which is operable to form a low-pressure zone in vacuum chamber 20.

Referring to FIG. 1-2, base 10 may be preheated by any suitable means, not shown. The article that is to be encased, such as a porous, fibrous fiberglass mat 30, or other porous material having good heat insulation and sound insulating properties, such as a composite material of layers of fiberglass and foam, is placed on support 14 over openings 16. The fiberglass may be either a molded or a woven material. The pattern of openings extends beyond the border of the mat.

The fiberglass mat 30 may have any suitable thickness and configuration. For example, the mat may have a configuration accommodating a motor vehicle part on which it is to be mounted. Further, several mats can be mounted on the base 10 and simultaneously encased. The mat 30 may have an irregular contour, and may be seated in a cavity, not shown, having a matching contour.

Referring to FIG. 2-3, a flexible, air impervious, polyethylene sheet 32, about 3 mm thick, is then mounted on the sidewalls above the mat 30. The sheet is mounted over the entire base. A four-sided frame 34 is lowered on the edges of the sheet onto shoulder 36 to form an air-tight seal around the top of the base. Thus, the mat 30 is disposed in a vacuum chamber defined by support 14, sidewall 12 and sheet 32. The sheet is preferably of the type known as an anti-static material, available from Carroll Products, Inc. of Sterling Heights, Mich.

Referring to FIG. 2, the base 10, mat 30 and sheet 32 are then placed beneath a radiant heater 40. Heater 40 is energized for a time sufficient to allow the sheet to become adhesive, and typically this take one to several seconds. The heat from both the base 10 and the radiant heater 40 heats sheet 32 such that it becomes somewhat molten, losing any wrinkles and becomes somewhat rounded between opposite sides of the sidewall 12. At this stage, the sheet becomes adhesive. In one embodiment, the base 10 further comprises an air passage 22 that provides fluid communication between the mat 30 and a vacuum source 26, said method further comprising the step of applying an air pressure differential through said air passages.

Figure 4:
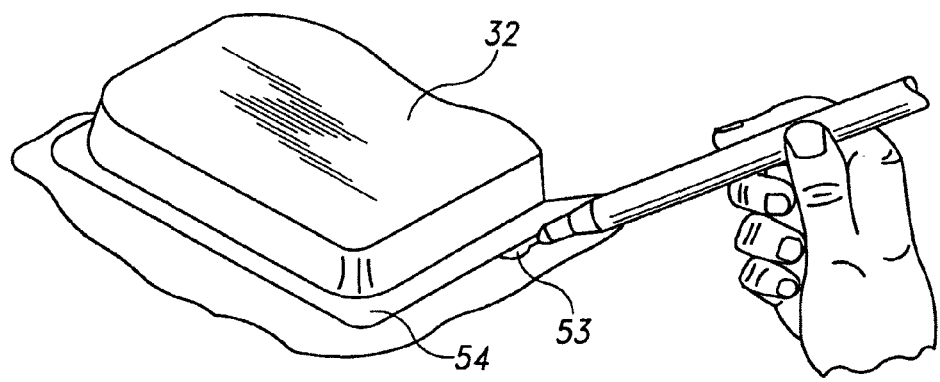
FIG. 4 illustrates the trimming step for the first plastic sheet 32.

Referring to FIG. 3, a vacuum pump then withdraws the air from chamber 20, and through openings 16 creates a low pressure area beneath sheet 32, drawing it into intimate contact with the mat 30. The vacuum is applied beneath the sheet 32 for about five seconds, until the sheet adheres to the mat 30 and becomes embedded in the surface of the fiberglass material. A blower 52 then blows cool air on the sheet 32 so that it freezes or takes a set, conforming to the configuration of the mat 30. The sheet is then trimmed to form a lip 54, about ½ inch wide, completely around the mat, as shown in FIG. 4.

Figure 5:
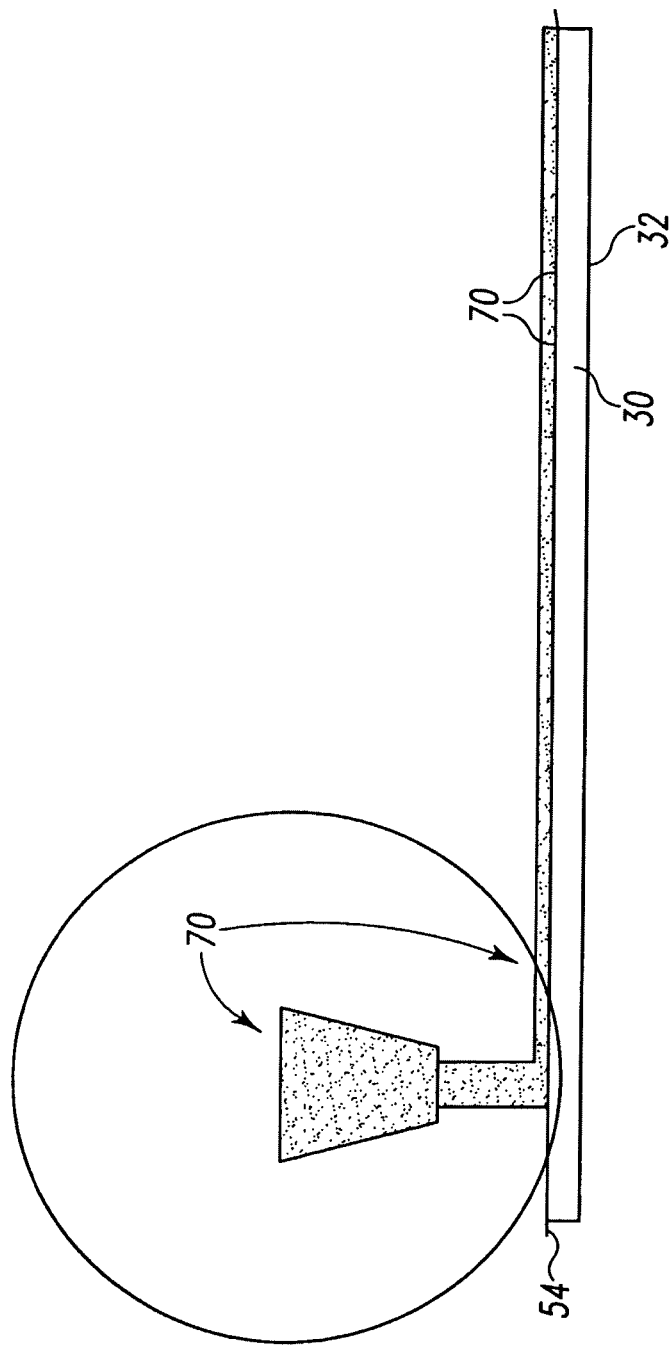
FIG. 5 illustrates the application of a fire retardant composition 70 to the exposed surface of the fiberglass product 30.

Referring to FIG. 5, mat 30 and trimmed sheet 32 are then turned upside-down and a fire retardant composition 70 is applied to the exposed surface of the mat 30. The fire retardant coated mat 30 is then placed on base 14 with the coated surface facing upwards.

Figure 6:
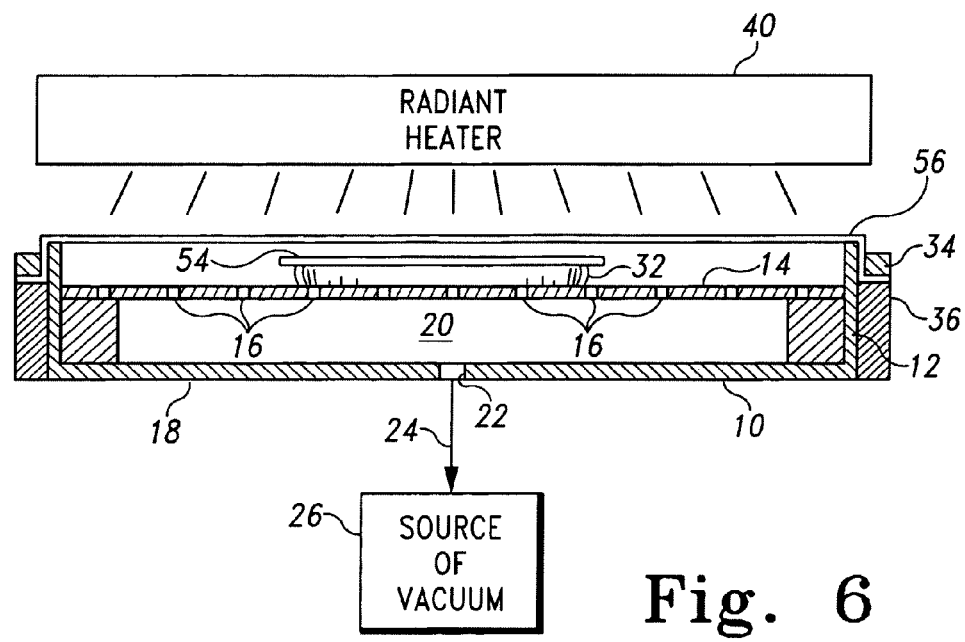
FIG. 6 illustrates the steps for attaching a second plastic sheet 56 to the fiberglass product 30 and lip 54.
Figure 7:
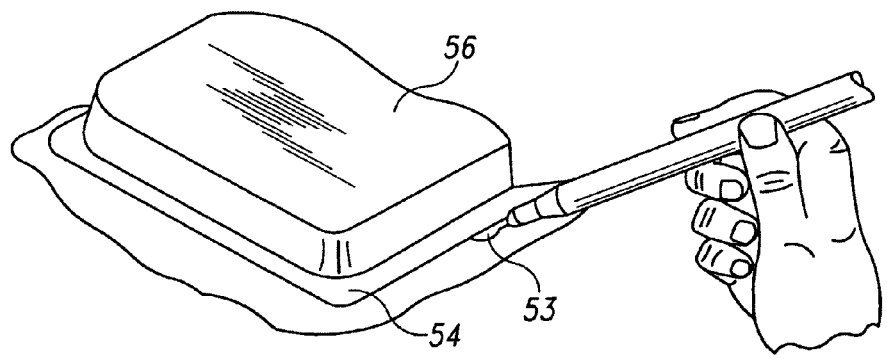
FIG. 7 illustrates the trimming step for the second plastic sheet 56.
Figure 8:
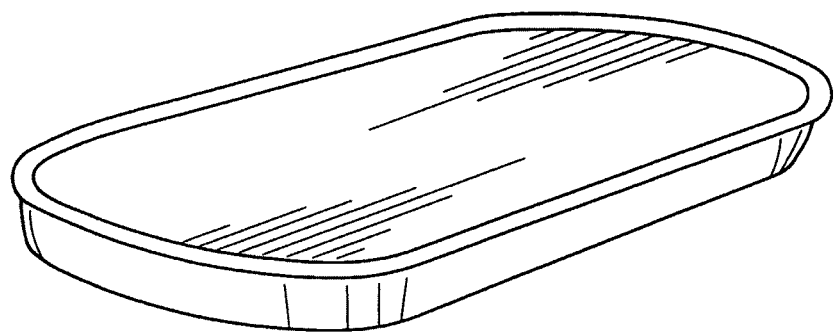
FIG. 8 illustrates a perspective view of an encased, fire retardant-coated fiberglass product.
Figure 9:
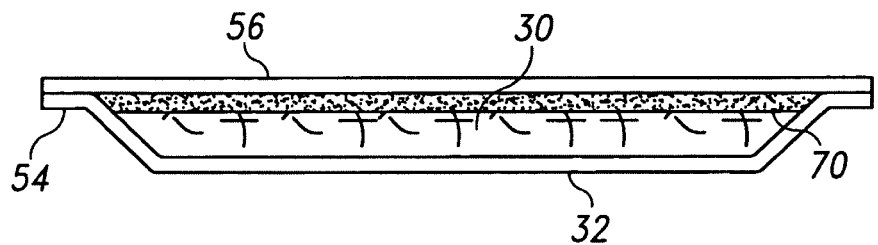
FIG. 9 illustrates a cross-sectional view of an encased, fire retardant-coated fiberglass product.

Referring to FIG. 6, a second sheet 56 of the same flexible plastic film as sheet 32, about 3 mm thick, is then mounted on sidewall 12 above the now coated mat to form the top wall of a vacuum chamber for the mat. The mat and the second sheet are then placed beneath the radiant heater 40. Sheet 56 is heated until it becomes adhesive. The vacuum pump is energized to create a low pressure zone beneath sheet 56 drawing it toward both the upper, exposed surface of the mat and lip 54. Sheet 56 then intimately contacts the mat and penetrates it to adhere to and become embedded in the fiberglass material. Sheet 56 contacts lip 54 to form a heat-sealed seam completely around the mat. Blower means 52 blows cooling air on sheet 56 to cool and freeze it. Sheet 56 is then trimmed, as illustrated in FIG. 7, to form a finished product, as illustrated in FIG. 8-9, in which the compressed mat is enclosed in an envelope formed by the two plastic sheets. Under some circumstances, the first sheet applied to the mat is perforated prior to adhering the second sheet to the fiberglass mat. In such an embodiment, the method further comprises the steps of perforating the first sheet of plastic material to form openings effective to introduce a vacuum therethrough, after the first sheet is bound to the fiberglass product and before the second sheet is biased into contact with the fiberglass product, and applying an air pressure differential between the second sheet and the base to bias the second sheet into contact with the fiberglass product and the first sheet. The perforations can then be sealed in a separate step after the second sheet is adhered to the fiberglass mat. The perforations can be sealed by applying a sealant or by reheating and cooling the first sheet. In some cases, the first sheet becomes somewhat porous as it becomes embedded in the mat, so that the piercing step is unnecessary.

Figure 10:
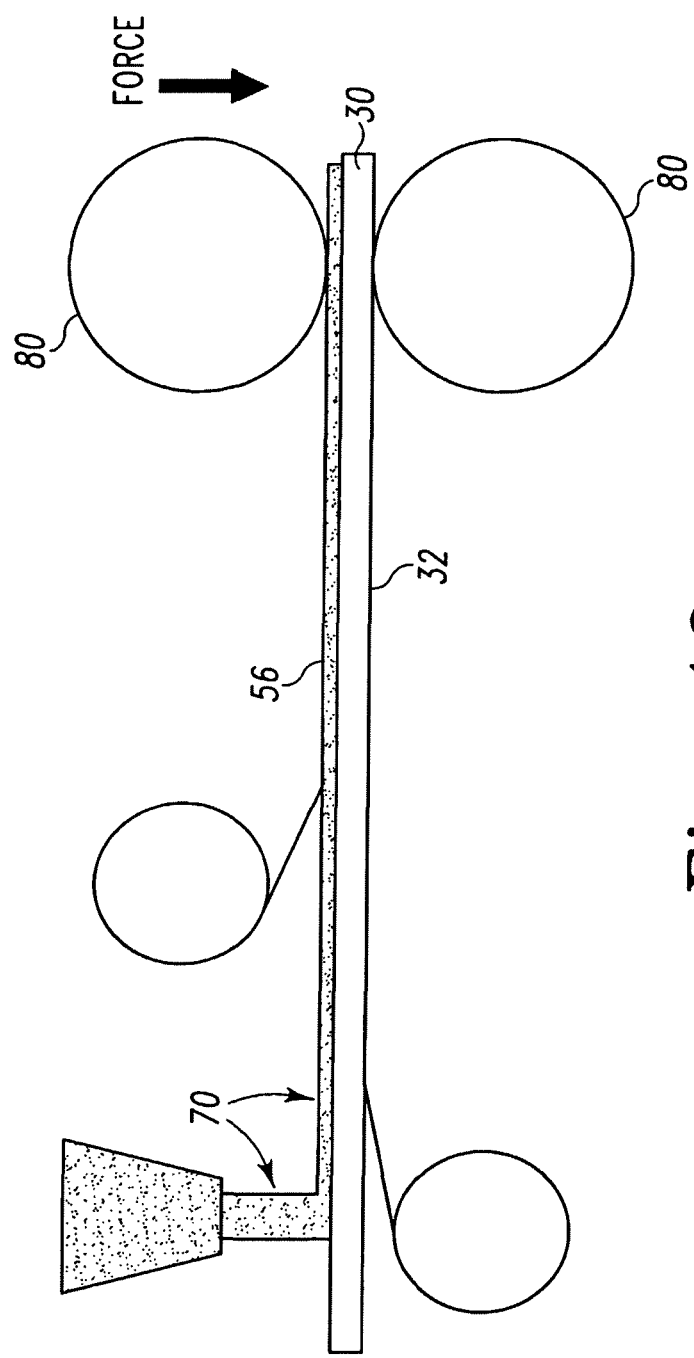
FIG. 10 illustrates the application of a fire retardant composition 70 to the exposed surface of the fiberglass product 30 and subsequent compression and heat sealing of the plastic encasement sheets 32 and 56 by non-stick rollers 80.

In another illustrative embodiment, and referring to FIG. 10, the method of preparing a flexible, enhanced fire resistant, encapsulated fiberglass product comprises the steps of coating a surface of a porous fiberglass product 30 with a composition comprising a fire retardant 70, disposing the coated porous fiberglass product between a first 32 and second 56 sheet of plastic and heat sealing the first and second sheets of plastic to form a seam around the coated porous fiberglass product to fully enclose the coated porous fiberglass product within a plastic encasement. In one variation, an opening is formed in the plastic encasement, and the plastic encasement is heated while air is exhausted from the interior of the plastic encasement through the plastic encasement opening until the heated plastic encasement adheres to the coated porous fiberglass product. In one aspect, the plastic encasement is heated by non-stick rollers 80 and compressed into the surface of the fiberglass, a process that is enhanced with pulses of air coming from the compression rollers. In another variation, a combination of vacuum and compression is used, during which a vacuum is used to embed the plastic encasement on one side of the fiberglass product and compression is used to embed the plastic encasement on the other side of the fiberglass product. The opening can then be sealed using standard techniques. It is to be understood that the fiberglass core and the plastic cover can be formed with different edge and surface configurations to accommodate various components to which the product is to be attached.

The following examples illustrate specific embodiments in further detail. It is contemplated that considerable variation and modification thereof are possible. These examples are provided for illustrative purposes only and should not be construed as limiting the invention or the inventive concept to any particular physical configuration in any way.

EXAMPLE 1

Preparation of Cured Fiberglass Batts

Cured fiberglass batts were prepared using conventional fiberglass manufacturing procedures; such procedures are described generally below and in U.S. Pat. No. 5,318,990, the disclosure of which is hereby incorporated herein by reference. Typically, a binder is applied to glass fibers as they are being produced and formed into a mat, water is volatilized from the binder, and the high-solids binder-coated fibrous glass mat is heated to cure the binder and thereby produce a finished fibrous glass batt which may be used, for example, as a thermal or acoustical insulation product, a reinforcement for a subsequently produced composite, etc.

A porous mat of fibrous glass was produced by fiberizing molten glass and immediately forming a fibrous glass mat on a moving conveyor. Glass was melted in a tank and supplied to a fiber forming device such as a spinner or a bushing. Fibers of glass were attenuated from the device and then blown generally downwardly within a forming chamber. The glass fibers typically have a diameter from about 2 to about 9 microns and have a length from about 0.25 inch (0.63 cm) to about 3 inches (7.62 cm). Typically, the glass fibers range in diameter from about 3 to about 6 microns, and have a length from about 0.5 inch (1.27 cm) to about 1.5 inches (3.81 cm). The glass fibers were deposited onto a perforated, endless forming conveyor. A phenol-formaldehyde resole binder was applied to the glass fibers, as they were being formed, by means of suitable spray applicators so as to result in a distribution of the binder throughout the formed mat of fibrous glass. The glass fibers, having the uncured binder adhered thereto, were gathered and formed into a mat on the endless conveyor within the forming chamber with the aid of a vacuum drawn through the mat from below the forming conveyor. The residual heat contained in the glass fibers as well as the air flow through the mat caused a majority of the water to volatilize from the mat before it exited the forming chamber.

As the high-solids binder-coated fibrous glass mat emerged from the forming chamber, it expanded vertically due to the resiliency of the glass fibers. The expanded mat was then conveyed to and through a curing oven wherein heated air was passed through the mat to cure the binder. Flights above and below the mat slightly compressed the mat to give the finished product a predetermined thickness and surface finish. Typically, the curing oven was operated at a temperature over a range from about 350° F. (177° C.) to about 600° F. (315° C.). Generally, the mat resided within the oven for a period of time from about 0.5 minute to about 3 minutes. For the manufacture of conventional thermal or acoustical insulation products, the time ranges from about 0.75 minute to about 1.5 minutes. The fibrous glass having a cured, rigid binder matrix emerged from the oven in the form of a batt which may be compressed for packaging and shipping and which will thereafter substantially recover its as-made vertical dimension when unconstrained. By way of example, a fibrous glass mat which is about 1.25 inches (3.18 cm) thick as it exits from the forming chamber, will expand to a vertical thickness of about 9 inches (22.86 cm) in the transfer zone, and will be slightly compressed to a vertical thickness of about 6 inches (15.24 cm) in the curing oven.

Typical nominal specifications for cured fiberglass batts prepared as described above were about 0.09 pounds per square foot (0.44 kg/m$^2$) weight, about 0.7 pounds per cubic foot (11.2 kg/m$^3$) density, about 1.5 inch (3.81 cm) thick, fiber diameter of about 22 hundred thousandths of an inch (5.6 microns), about 11% binder content after curing, and about 0.7% mineral oil content for dedusting (dedusting oil). Curing oven temperature was set at about 460° F. (238° C.). Uncured fiberglass blanket exited the forming chamber white to off-white in apparent color, whereas cured fiberglass batting exited the oven yellowish brown in apparent color and well bonded. Cured fiberglass batting was used to prepare fire-resistant, encapsulated fiberglass batts as described in Example 2.

EXAMPLE 2

Preparation of Fire-Resistant, Encapsulated Fiberglass Batts

Cured fiberglass batting, prepared as described in Example 2, was treated with the fire retardant, monoammonium phosphate, which was applied as a powder, i.e., salted, onto the surface of cured fiberglass batting. Encapsulating ethylene vinyl acetate polymer film was applied over the surface of the fire retardant-treated fiberglass batting, and the film then radiantly heated as a vacuum was pulled through the fire retardant-treated fiberglass batting to mechanically bond the ethylene vinyl acetate polymer film and monoammonium phosphate powder together by melting. As an alternative method, heated platens and compression were used rather than vacuum with radiant heat. Fire-resistant, encapsulated fiberglass batts of varying size, thickness, and amount of fire retardant per square meter of fiberglass surface were produced by the afore-mentioned process. The surface(s) of the encapsulated fiberglass batts under which surface(s) monoammonium phosphate fire retardant had been applied, was (were) rough in texture. Encapsulated fiberglass batts without fire retardant were prepared by the afore-mentioned process as control samples.

EXAMPLE 3

Testing/Evaluation of Fire-Resistant, Encapsulated Fiberglass Batts

Fire-resistant, encapsulated fiberglass batts, prepared as described in Example 2, wherein the color of the resulting encapsulating ethylene vinyl acetate polymer was black and the thickness of the resulting encapsulating ethylene vinyl acetate polymer was about 2.5 Mills (0.063 mm), were tested versus a variety of encapsulated and non-encapsulated fiberglass batt controls, as well as versus several non-fiberglass control samples, for surface burning behavior and/or sound absorption. The results of these tests are shown in Tables 1-2, respectively. Specific tests conducted and conditions for performing these tests are as follows:

Surface Burning Behavior

Surface burning behavior for fiberglass and non-fiberglass samples was determined in accordance with ASTM E84-03, "Surface Burning Characteristics of Building Materials." This test, conducted in a 25-foot (7.62 m) tunnel, is applicable to exposed surfaces, such as ceilings or walls, provided that the material or assembly of materials, by its own structural quality of the manner in which it is tested and intended for use, is capable of supporting itself in position or being supported during the test period. The purpose of the test method is to determine the relative burning behavior of the material by observing the flame spread along the specimen. Flame spread and smoke density developed are reported, however, there is not necessarily a relationship between these two measurements.

The ASTM E84-03 test method is intended to compare the surface flame spread and smoke developed measurements to those obtained from tests of mineral fiber cement board and select grade of red oak flooring. The test specimen surface (18 inches (45.72 cm) wide and 24 feet (7.31 m) long) is exposed to a flaming fire exposure during a 10-minute test duration, while flame spread over its surface and density of the resulting smoke are measured and recorded. Test results are presented as the computed comparisons to the standard calibration materials.

A furnace used for the ASTM E84-03 test method is considered under calibration when a 10-minute test of red oak flooring will pass flame out the end of the tunnel in 5 minutes, 30 seconds±15 seconds. Mineral fiber cement board forms the zero point for both flame spread and smoke developed indexes, while the red oak flooring smoke developed index is set as 100.

A fire-resistant, encapsulated fiberglass test specimen included six samples, each of which was 4 feet (1.22 m, length)×2 feet (0.61 m, width)×1 inch (2.54 cm, thickness). The specimen was supported on 0.25-inch (0.63-cm) steel rods spaced every 2 feet (0.61 m) down the length of the apparatus. During the test, the specimen ignited at 0:08 (min: sec). Flaming drops began to fall at 0:20 (min:sec). The test continued for the 10:00 (min:sec) duration.

An encapsulated fiberglass control specimen included six samples, each of which was 4 feet (1.22 m, length)×2 feet (0.61 m, width)×0.63 inch (1.60 cm, thickness). The specimen was supported on 0.25-inch (0.63-cm) steel rods spaced every 2 feet (0.61 m) down the length of the apparatus. During the test, the specimen ignited at 0:15 (min:sec). The test continued for the 10:00 (min:sec) duration.

Sound Absorption

Sound absorption tests were conducted on fiberglass samples in accordance with ASTM C423-90a, "Standard Test Method for Sound Absorption and Sound Absorption Coefficients by the Reverberation Room Method." These tests were conducted using a Type A Mounting as described in ASTM E795-93, "Standard Practices for Mounting Test Specimens During Sound Absorption Tests."

The ASTM C423-90a test method describes the measurement of sound absorption by analyzing the decay rate of sound in a reverberation room. The difference of the decay with and without the specimen in the room is utilized to determine the sound absorption of the specimen under test. The sound absorption coefficient is ideally defined as the fraction of the randomly incident sound power absorbed by the material. The greater the coefficient, the greater the sound absorption. The Noise Reduction Coefficient (NRC) is a single number obtained by taking the arithmetic average of the absorption coefficients at 250, 500, 1000, and 2000 Hz rounded to the nearest multiple of 0.05.

TABLE 1

Surface Burning Behavior[a] of Fire-Resistant, Encapsulated Fiberglass Batts vs. Control Samples

| Test Specimen | Flame Spread Index | Smoke Developed Index |
|---|---|---|
| Mineral Fiber Cement Board | 0 | 0 |
| Red Oak Flooring | 90 | 100 |
| Encapsulated Fiberglass Batts[b,c] | 1260 | 10 |
| Fire-Resistant Encapsulated Fiberglass Batts[b,d] | 25 | 25 |

[a]Determined by ASTM E84-03
[b]From Example 2
[c]Fiberglass discoloration, as well as melting and consumption of ethyl vinyl acetate polymer film observed upon test completion
[d]Fiberglass flame bleaching (white discoloration) and black discoloration, as well as melting and consumption of ethyl vinyl acetate polymer film observed upon test completion

TABLE 2

Sound Absorption Coefficients[a] for Fire-Resistant, Encapsulated Fiberglass Batts vs. Fiberglass Controls

| | Sound-Absorption Coefficients[a] One-Third Octave Band Center Frequency, Hz | | | | | | |
|---|---|---|---|---|---|---|---|
| Sample | 125 Hz | 250 Hz | 500 Hz | 1000 Hz | 2000 Hz | 4000 Hz | NRC[b] |
| 1[c] | 0.16 | 0.44 | 0.80 | 1.09 | 0.87 | 0.38 | 0.80 |
| 2[d] | 0.01 | 0.48 | 0.94 | 1.16 | 0.91 | 0.49 | 0.85 |
| 3[e] | 0.00 | 0.13 | 0.57 | 0.96 | 0.96 | 0.46 | 0.65 |
| 4[f] | 0.03 | 0.24 | 0.42 | 0.63 | 0.77 | 0.94 | 0.50 |
| 5[g] | 0.02 | 0.32 | 0.64 | 0.92 | 1.03 | 1.05 | 0.75 |
| 6[h] | 0.02 | 0.23 | 0.64 | 0.89 | 0.99 | 1.00 | 0.70 |
| 7[i] | 0.20 | 0.58 | 1.00 | 1.09 | 1.12 | 1.14 | 0.95 |
| 8[j] | 0.17 | 0.50 | 0.92 | 1.10 | 1.13 | 1.25 | 0.90 |

[a]Sound absorption coefficient = fraction of the randomly incident sound power absorbed by the material at 70° F. (21° C.), 36% relative humidity; determined by ASTM C423-90a
[b]NRC = Noise Reduction Coefficient = single number rating obtained by taking the arithmetic average of the sound absorption coefficients at 250, 500, 1000, and 2000 Hz rounded to the nearest multiple of 0.05.
[c]1.5 lb (0.68 kg) density, 1 inch (2.54 cm) thick, fire-resistant, encapsulated fiberglass batt from Example 2. Sample size: 72 square feet (6.69 square meter) (6 pieces, 4 feet (1.22 meter) × 3 feet (0.91 meter)). No edge treatment used. Sample weight: 12 pounds (5.44 kg).
[d]2.0 lb (0.91 kg) density, 1 inch (2.54 cm) thick, fire-resistant, encapsulated fiberglass batt from Example 2. Sample size: 72 square feet (6.69 square meter) (6 pieces, 4 feet (1.22 meter) × 3 feet (0.91 meter)). No edge treatment used. Sample weight 15 pounds (6.80 kg).
[e]2.0 lb (0.91 kg) density, 0.5 inch (1.27 cm) thick, fire-resistant, encapsulated fiberglass batt from Example 2. Sample size: 72 square feet (6.69 square meter) (6 pieces, 4 feet (1.22 meter) × 3 feet (0.91 meter)). No edge treatment used. Sample weight 9.5 pounds (4.31 kg).
[f]1.5 lb (0.68 kg) density, 0.75 inch (1.90 cm) thick equipment liner. Sample size: 72 square feet (6.69 square meter) (2 pieces, 4 feet (1.22 meter) × 9 feet (2.73 meter)). No edge treatment, mat side up. Sample weight 8 pounds (3.63 kg)
[g]3.0 lb (1.36 kg) density, 1 inch (2.54 cm) thick rigid plenum liner. Sample size: 80 square feet (7.43 square meter) (10 pieces, 2 feet (0.61 meter) × 4 feet (1.22 meter)). No edge treatment, mat side up. Sample weight 21 pounds (9.53 kg).
[h]3.0 lb (1.36 kg) density, 1 inch (2.54 cm) rigid plenum, liner M. Sample size: 80 square feet (7.43 square meter) (10 pieces, 2 feet (0.61 meter) × 4 feet (1.22 meter)). No edge treatment, mat side up. Sample weight 21 pounds (9.53 kg).
[i]0.75 lb (0.34 kg) density, 2 inch (5.08 cm) fiberglass blanket. Sample size: 72 square feet (6.69 square meter) (2 pieces, 4 feet (1.22 meter) × 9 feet (2.74 meter)). No edge treatment. Sample weight 10 pounds (4.54 kg).
[j]1.0 lb (0.45 kg) density, 2 inch (5.08 cm) fiberglass blanket. Sample size: 77.67 square feet (7.22 square meter) (4 pieces, 2.42 feet (0.74 meter) × 8 feet (2.44 meter)). No edge treatment. Sample weight 13 pounds (5.90 kg).

The invention claimed is:

1. An article of manufacture comprising:
   a cured fiberglass product comprising fibers and a binder;
   a flexible plastic cover encasing said fiberglass product; and
   a granular fire retardant composition, wherein:
   (i) the granular fire retardant composition is positioned between said fiberglass product and said plastic cover,
   (ii) the fibers are fine fibers having diameters in the range from about 1 micron to about 10 microns,
   (iii) the article of manufacture has a Noise Reduction Coefficient of 0.65 or higher, when tested in accordance with ASTM C 423, (iv) the article of manufacture includes the granular fire retardant composition in an amount ranging from about 0.5 grams to about 5 grams of active ingredient per square meter, (v) the flexible plastic cover is partially embedded in the fiberglass product, and (vi) the flexible plastic cover comprises a thermoplastic polymer having a molecular weight in the range from about $1\times10^3$ g/mole to about $5\times10^6$ g/mole, under the proviso that the granular fire retardant is not blended with a polymer and incorporated into a film structure.

2. The article of manufacture of claim 1 wherein said plastic cover inhibits fluid communication between the interior space of the plastic cover and the exterior environment.

3. The article of manufacture of claim 2 wherein said fiberglass product has a first and second surface and a side edge extending between said first and second surfaces and along the entire perimeter of the first and second surface, and said plastic cover comprises a first and second sheet of flexible plastic in contact with, and at least partially embedded into the first and second surface of the fiberglass product, wherein the first and second sheets of said plastic cover are bound to one another adjacent to the side edge of the fiberglass product to form a continuous seam around the fiberglass product.

4. The article of manufacture of claim 3 wherein the first and second sheets of said plastic cover are bound to one another through the use of an adhesive.

5. The article of manufacture of claim 3 wherein said first and second flexible plastic sheets comprise a thermoplastic resin that becomes adhesive when heated and the first and second sheets of said plastic cover are bound to one another by a heat-sealed seam.

6. The article of manufacture of claim 5 wherein the granular fire retardant composition comprises a compound selected from the group consisting of monoammonium phosphate and diammonium phosphate.

7. The article of manufacture of claim 6 wherein said granular fire retardant composition is coated on an interior surface of said plastic cover.

8. The article of manufacture of claim 6 wherein the granular fire retardant composition is embedded into said plastic.

9. The article of manufacture of claim 6 wherein said granular fire retardant composition is coated on a surface of the fiberglass product.

10. The article of manufacture of claim 6 wherein said granular fire retardant composition is coated on the first and second surface of the fiberglass product.

11. The article of manufacture of claim 6 wherein the fiberglass product comprises a fiberglass mat having an R-value of at least about 2.5 per inch.

12. The article of manufacture of claim 6 wherein the plastic cover is comprised of ethylene vinyl acetate.

13. The article of manufacture of claim 1 wherein the plastic cover comprises a fluid impermeable plastic that becomes adhesive upon heating.

14. The article of manufacture of claim 13 wherein the plastic cover comprises a thermoplastic polymer.

15. The article of manufacture of claim 14 wherein the thermoplastic polymer is selected from the group consisting of polyvinyl chloride, nylon, polyethylene, polystyrene, polypropylene, polyethylene terephthalate, ethylene vinyl acetate, blends thereof, and mixtures thereof.

16. The article of manufacture of claim 14 wherein the thermoplastic polymer has a molecular weight in the range from about $2\times10^5$ g/mole to about $3\times10^6$ g/mole.

17. The article of manufacture of claim 14 wherein the thermoplastic polymer is ethylene vinyl acetate.

* * * * *